United States Patent [19]
Sakyo et al.

[11] Patent Number: 5,722,108
[45] Date of Patent: Mar. 3, 1998

[54] WINDSHIELD WIPER CONTROL DEVICE FOR CONSTRUCTION MACHINES

[75] Inventors: Tsuyoshi Sakyo, Chiyoda-machi; Yoshimi Iwase, Mitsukaido, both of Japan

[73] Assignee: Hitachi Construction Machinery Co., Ltd., Tokyo, Japan

[21] Appl. No.: 836,041

[22] PCT Filed: Sep. 9, 1996

[86] PCT No.: PCT/JP96/02561

§ 371 Date: May 12, 1997

§ 102(e) Date: May 12, 1997

[87] PCT Pub. No.: WO97/10130

PCT Pub. Date: Mar. 20, 1997

[30] Foreign Application Priority Data

Sep. 11, 1995 [JP] Japan ................................ 7-257254

[51] Int. Cl.[6] ................................................ B60S 1/08
[52] U.S. Cl. .................. 15/250.19; 15/250.001; 15/250.3; 296/96.15; 296/146.16; 296/146.1; 49/160; 49/197; 49/31; 49/72
[58] Field of Search .................. 15/250.19, 250.3, 15/250.001, 250.31, 250.11, 250.34; 296/84.1, 89, 96.15, 96.2, 146.16, 155, 146.1; 49/159, 160, 197, 13, 31, 72

[56] References Cited

U.S. PATENT DOCUMENTS

| | | | |
|---|---|---|---|
| 5,090,082 | 2/1992 | Alber et al. | 15/250.001 |
| 5,570,923 | 11/1996 | Taylor | 15/250.19 |

FOREIGN PATENT DOCUMENTS

| | | |
|---|---|---|
| 59-70853 | 5/1984 | Japan . |
| 62-33918 | 2/1987 | Japan . |
| 62-54861 | 4/1987 | Japan . |
| 1-297340 | 11/1989 | Japan . |
| 5-5621 | 1/1993 | Japan . |
| 6-22128 | 3/1994 | Japan . |

*Primary Examiner*—Gary K. Graham
*Attorney, Agent, or Firm*—Oblon, Spivak, McClelland, Maier & Neustadt, P.C.

[57] ABSTRACT

For a vertical slide type front window of an operator's cab of construction machines, a windshield wiper assembly is mounted on a panel alongside the front window. Mounted on the part of the front window is a pin-latch unit for fixing the front window in a fully closed position. When a slide pin of the pin-latch unit is applied to lock the front window, this is detected by a detection means of a windshield control to render the wiper operative.

10 Claims, 7 Drawing Sheets

WINDSHIELD WIPER CONTROL DEVICE FOR CONSTRUCTION MACHINES

TECHNICAL FIELD

This invention relates to a windshield wiper control device for construction machines, and more particularly to a windshield wiper control device suitable for controlling operation of a windshield wiper which is installed on a front window of an operator's cab of construction machines such as hydraulic power shovels or the like.

TECHNICAL BACKGROUND

Hydraulic power shovels and hydraulic cranes are typical examples of construction machines. For instance, in the case of a hydraulic power shovel, the machine is generally arranged as shown in FIG. 8, including a vehicular base carrier 1 and an upper rotary body 2 which is rotatably mounted on top of the base carrier 1 through a swivel ring 3. Mounted on top of the rotary body 2, along with a front working mechanism (not shown) for excavation or other ground working jobs, is an operator's cabin 4 to be occupied by an operator for operating the hydraulic power shovel.

As shown in FIG. 9, the operator's cab is enclosed by structural members including frames 5 and roof 6, and provided with windows on four sides, i.e., front and rear windows and side windows. Fitted on the front side is a front window 7 which is vertically movable to and from a fully closed position and a fully open position. For this purpose, the frame 5 is provided with guide grooves 8 in wall portions adjoining opposite lateral sides of the front window 7. Each one of the guide grooves 8 includes a first guide groove section 8a which is inclined in conformity with inclination angle of the front window 7 (i.e., disposed vertically in case the front window is set in a vertically upright position), and a second guide groove section 8b which is extended parallel with the roof 6, contiguously turned from the upper end of the first guide groove section 8a. The guide groove 8 is formed in an arcuately curved form in the transitional corner portion which connects the first and second sections 8a and 8b with each other. Further, as shown in FIG. 10, for engagement in the guide grooves 8, the window 7 is provided with paired upper and lower rollers 9 which are projected sideward from opposite lateral sides of a window frame 7b which is fitted with a pane 7a.

Accordingly, the respective rollers 9 are positioned within the first guide groove section 8a as long as the front window 7 is in a closed position. However, upon lifting up the front window 7 to open same, the rollers 9 are moved along the guide grooves 8. At this time, firstly the upper rollers 9 are moved into second guide section 8b through the curved transitional section, followed by ascension and movement into the second guide section 8b of the lower rollers 9. The front side of the operator's cab is opened completely when the front window 7 is turned up substantially parallel with the roof 6. As a result, a broader view field is opened in front of the operator who is seated in the operator's cab 4, making it easier for the operator to confirm an excavating position on the ground immediately on the front side of the operator's cab 4, especially in the case of a deep excavating operation. A broad and clear view field can also be secured by opening the front window 7 when the window pane 7a is covered with dirt or other contaminants.

Since the hydraulic power shovel is used in open air no matter whether it rains or not, a windshield wiper assembly 10 is normally provided for the front window 7, and, on a rainy day, it is turned on to wipe water droplets and water films off the window pane 7a for securing a clear view field through the front window. The windshield wiper assembly 10 is generally constituted by an oscillating arm which is put in back and forth oscillating motion over a predetermined angle, and a wiping appliance which grips a wiper blade of resilient material in a blade holder, which has its middle portion pivotally connected to a fore end portion of the oscillating arm. The wiping appliance is moved back and forth by the oscillating arm, with the wiper blade in sliding contact with the surface of the windshield glass or pane 7a. Normally, the oscillating arm of the wiper assembly is attached on the frame 7b of the front window 7.

In this connection, in order to secure a broader view field through the front window, obstructive objects should be removed out of the boundaries of the front window as much as possible. In case a windshield wiper assembly is installed on the front window frame, the view through the front window is constantly obstructed not only by the oscillating arm but also by drive means and wiping appliance which are always located on the windshield glass. As well known in the art, attempts have thus far been made to avoid this problem by mounting a windshield wiper on a frame structure on the part of the operator's cab instead of the front window frame, for example, as described in Japanese Laid-Open Utility Model Specification H4-2718. In such a case, however, if the windshield wiper is actuated when the front window is open, the wiper which is free from the restraint by the windshield glass cannot keep itself from falling into the operator's cab. Accordingly, for instance, if an operator inadvertently pushes on the wiper button under such circumstances, it could abruptly fall toward the operator. Besides, if the wiper is actuated when the front window is in a half-open state, the wiper blade holder might be damaged by hitting against the window frame.

In order to avoid these troubles, it is necessary to enable the power switch of the wiper as long as the window is fully closed and to disable or lock the switch in an inoperative state while the window is open, especially in a case where the windshield wiper assembly is mounted on a window frame as explained above. For this purpose, it is necessary to check for the position of the front window and to disable or lock the power switch of the wiper whenever the front window is found to be in an open position.

In this regard, it has been the general practice to provide a stopper in association with a front window for the purpose of locking same in a fully open position. Therefore, in detecting whether or not a front window is in an open position, such a window locking stopper could be used in such a way as to lock the power switch of the windshield wiper in an inoperative state whenever the window locking stopper is found to be ON, as described in Japanese Laid-Open Utility Model Specification H4-2718. However, taking into account the possibilities of the front window being left in a half-open position short of the window locking stopper, the prior art measure of disabling or locking the wiper switch in relation with application of the window locking stopper is regarded incomplete as safety measures or as measures for preventing damages to the wiper.

Instead, from the standpoint of safety for the operator and prevention of damages to the wiper, it is desirable to unlock or enable the wiper switch only when the front window is detected to be in a fully closed state. For this purpose, it is conceivable to provide in one of the above-described guide grooves a detector switch which is responsive to gravitational force of the front window in a closed position.

In this connection, in order to ensure smooth movements at the time of opening and closing the front window, generally the guide grooves, which are in engagement with the rollers on the part of the front window frame, are broadened in a transitional section between the above-mentioned vertical and horizontal guide groove sections. Therefore, even when the front window is in a closed position, the rollers which are located in the broadened sections of guide grooves are more or less movable in forward or backward directions depending upon the extent of broadening of the guide grooves in the transitional portions. On the other hand, the wiper assembly which is mounted on the frame of the operator's cab is arranged to withdraw the wiper arm and blade into a receded position on or alongside the cab's frame when not in use. However, movements of the front window in forward or backward direction not only make it difficult to move the wiper arm and blade smoothly between an operating position on the window and a receded rest position on the cab's frame but also instabilize the wiper operation due to fluctuations in the pressure under which the wiper blade is abutted against the window pane.

DISCLOSURE OF THE INVENTION

In view of the foregoing situations, it is an object of the present invention to provide a windshield wiper control device which can operate a windshield wiper in safe conditions while securing a broad view field in forward directions.

It is another object of the present invention to provide a windshield wiper control device which can render a windshield wiper inoperative unless a front window is fixed in a fully closed position.

It is still another object of the present invention to provide a windshield wiper control device which can securely prevent inadvertent actuation of the wiper when the front window is open.

According to the present invention, the above-stated objectives are achieved by the provision of a windshield wiper control device which is characterized by: a vertical slide type front window fitted on the front side of an operator's cab; a windshield wiper assembly mounted on a frame of the driver's cab alongside the front window and having a wiper blade for cleaning the front window pane; a pin-latch unit for locking the front window in a fully closed position; and a detection means for detecting locked state of the front window by way of application of a slide pin of the pin-latch unit; the windshield wiper control rendering the windshield wiper operative on the basis of a detection signal from the detection means.

BEST MODE FOR CARRYING OUT THE INVENTION

Figure 1:
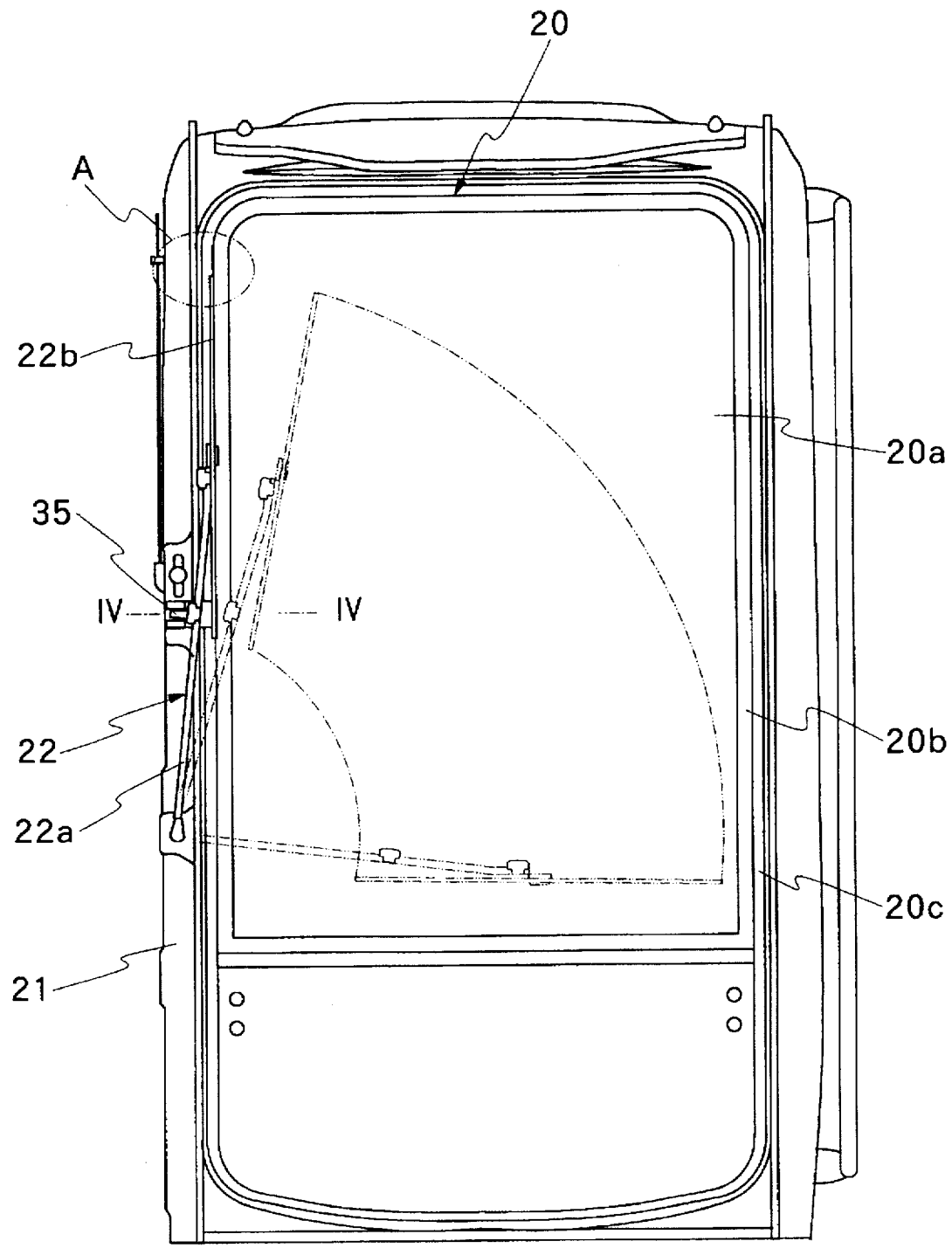
FIG. 1 is an outer view of a front window on an operator's cab of a construction machine embodying the present invention.

Hereafter, the invention is further described by way of its preferred embodiments. In the following description, the component pars which are identical or common with prior an counterparts are simply designated by common reference numerals or characters without repeating same depictions and explanations.

In the drawings, indicated at 20 is a front window which has a pane of glass 20a fitted in a window frame 20c through a stopper member 20b of rubber or the like. Provided around the front window 20 is a frame 21 of an operator's cab. Similarly to the prior art counterpart described hereinbefore, the front window 20 is provided with rollers which are movable up and down along guide grooves on the frame 21 for opening and closing the front window 20. A windshield wiper assembly 22 is mounted on the frame 21 along side the front window 20.

Figure 2:
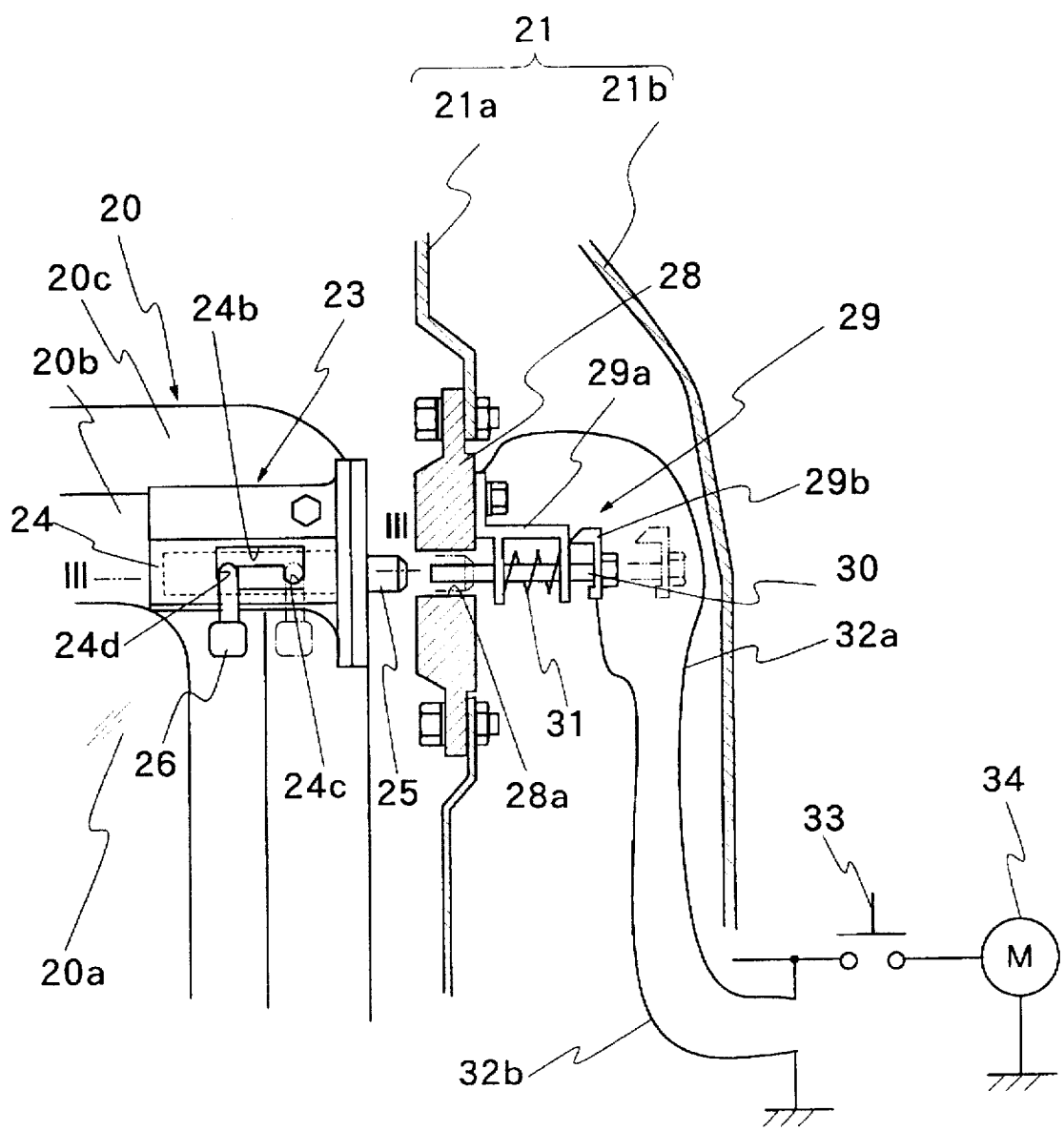
FIG. 2 is an inside view of the operator's cab in the regions within the circle A in FIG. 1.

For the purpose of locking the front window 20 in a fully closed position, a pin-latch unit 23 is provided on the window frame 20c as shown in FIG. 2. The pin-latch unit 23 is largely composed of a slide guide 24 which is fixed on the front window frame 20c by bolts or other suitable fixation means, and a slide pin 25 which is slidably received in the slide guide 24. The slide pin 25 is provided with an operating knob 26 and thereby shiftable into and out of a locking position in the manner as will be described hereinlater.

Figure 3:
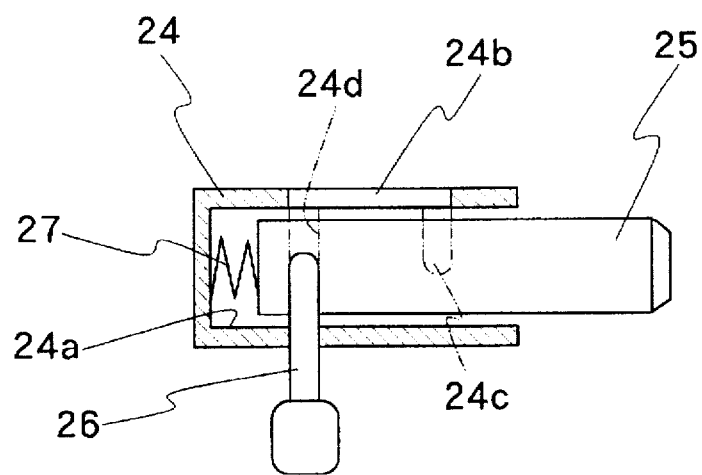
FIG. 3 is a schematic sectional view taken on line III—III of FIG. 2.

As illustrated in FIG. 3, the slide guide 24 is provided with a hollow slide channel 24a for receiving the slide pin 25. Formed in an intermediate portion of the slide channel 24a is an axial slot 24b of a width suitable for receiving the afore-mentioned operating knob 26. Interposed between base end portions of the slide pin 25 and slide guide 24 is a pusher spring 27 which constantly urges the slide pin 25 to protrude out of the slide guide 24. As a result, the fore end of the slide pin 25 is projected out of the slide guide 24 by a predetermined length. In order to fix the slide pin 25 in this projected state, the slot 24b is provided with a first positioning notch 24c at one end thereof, the first positioning notch 24c being indented from the slot 24b in a direction perpendicular to the length of the slot 24b. As the slide pin 25 is pushed backward against the action of the pusher spring 27 until the operating knob 26 reaches the other end of the slot 24b, the slide pin 25 is retracted into the slide guide 24, and can be retained in this retracted position by engaging the operating knob 26 in a second positioning notch 24d which is similarly indented perpendicularly from the slot 24a at the other end thereof.

The frame 21 is provided with an opening in its inner wall 21a in such a position as to confront face to face with the slide pin 25 when the front window 20 is closed. Fixedly mounted in this opening of the inner wall 21a is a pin holder 28 which is provided with a pin receptacle hole 28a.

Therefore, when the window 20 is closed, if the operating knob 26 is shifted into a second position in engagement with the second positioning notch 24d, the slide pin 25 is retracted into the slide guide 24, disengaging from the pin receptacle hole 28a of the pin holder 28. In this state, the front window 20 can be opened or closed as desired. When the slide pin 25 is shifted away from the second positioning notch 24d and set in an applied or locking position by dropping the operating knob 26 into the first positioning notch 24c, it is protruded into the pin receptacle hole 28a of the pin holder 28 to fix the front window 20 in the closed position.

The frame 21 includes, in addition to the afore-mentioned inner wall 21a, an outer wall 21b in a predetermined spaced relation with the inner wall 21a. Located within a space on the inner side of the pin holder 28 on the inner wall 21a is a switch 29, which is constituted by a stationary contact 29a which is mounted fixedly on the pin holder 28, and a movable contact 29b which is movable toward and away from the stationary contact 29a along with a pusher rod 30 of an electrically insulating material which carries the movable contact 29b. Normally, the pusher rod 30 is submissive to the action of a biasing spring 31 and thereby urged to close the movable contact 29b on the stationary contact 29a, holding the switch 20 in ON-state. Then, if the slide pin 25 is displaced into the applied position, pushing the pusher rod 30 against the action of the spring 31, the movable contact 29b is moved away from the stationary contact 29a to open the switch 20 into OFF-state. Wires 32a and 32b from the stationary and movable contacts 29a and 29b are passed through the internal space of the frame 21 without being exposed to the outside.

Further, indicated at 33 in FIG. 2 is a power switch of the windshield wiper, which is provided in the vicinity of an operator's seat in the operator's cabin. As soon as the power switch 33 is turned on, a wiper drive motor 34 is actuated to drive the oscillating wiper arm 22a. However, as long as the window switch 29 remains ON, the wiper switch 33 is locked in an inoperative state. Therefore, the motor 34 would not be started even if the wiper switch 33 is operated by the operator fro starting the wiper. It is only when the window switch 29 is turned off that the wiper switch 33 is unlocked and becomes operative. Accordingly, in unlocked this state, the motor 34 can be started as soon as the wiper switch 33 is turned on by the operator.

Figure 4:
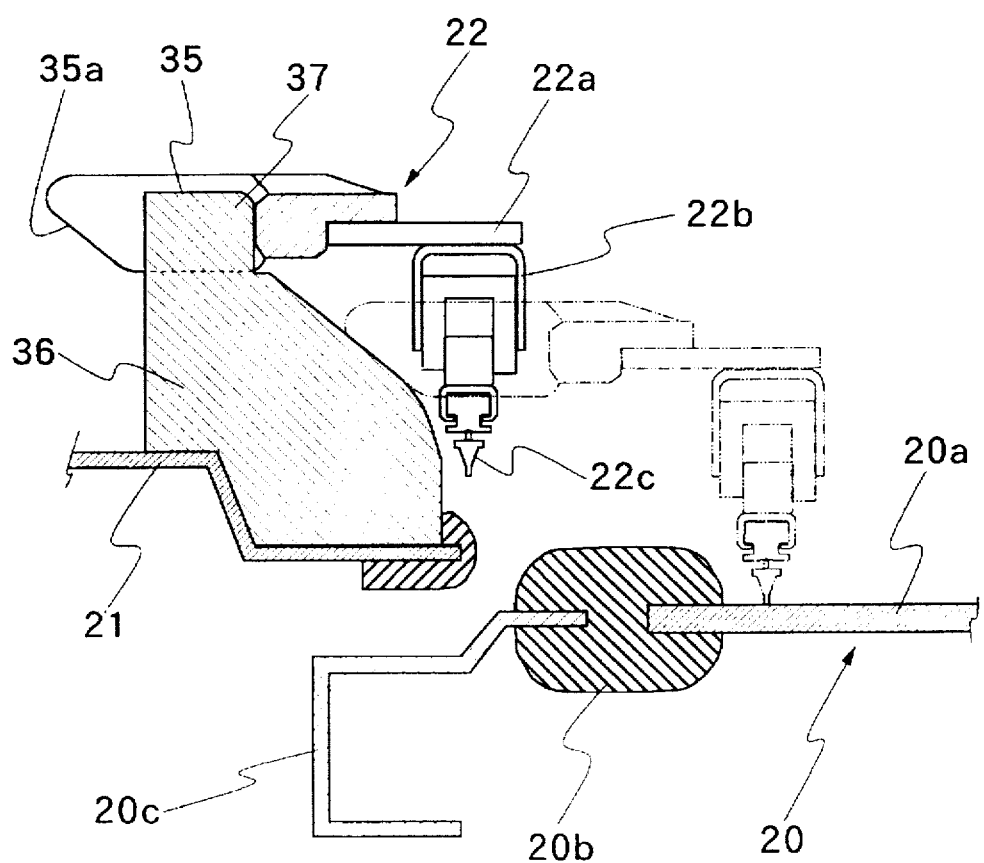
FIG. 4 is a schematic sectional view taken on line IV—IV of FIG. 1.

As described above, the wiper switch 33 can be turned on to actuate the windshield wiper 22 only when and as long as the window switch 29 is OFF. In this instance, similarly the windshield wiper assembly 22 is composed of an oscillating arm 22a which is swingably mounted on the frame 21, a wiper blade holder 22b pivotally attached to the fore end of the oscillating arm 22a, and a wiper blade 22c of rubber or similar resilient material gripped in the wiper blade holder 22b. As indicated by solid line in FIG. 1, the wiper blade 22c rests on the frame 21 when the wiper 22 is not used. On the other hand, when in wiping operation, the oscillating arm 22a of the wiper 22 is put in oscillatory motion on the windshield 20a, alternately sweeping a sectoral region of the windshield with the wiper blade 22c as indicated by imaginary line in FIG. 1. In order to let the wiper blade 22c ride smoothly onto the frame 21 and return to a receded rest position as soon as the wiper 22 is turned off, a slide block 35 with an inclined surface 35a is attached on an intermediate portion of the oscillating arm 22a as shown in FIG. 4. Correspondingly to this inclined surface 35a of the slide block 35, a sloped wall member 36 is provided on the part of the frame 21. Accordingly, when the wiper 22 is not in use, the wiper blade 22 is located in the receded rest position indicated by solid line in the same figure, completely out of the boundaries of the front window 20, and when in operation, it is held in sliding contact with the front window pane 20a as indicated by imaginary line. The reference numeral 37 indicates a stopper member which engages with the slide block 35 to retain the wiper 22 in the predetermined rest position when not used.

In the rest position of the wiper 22, the slide block 35 stays on top of the frame 21, holding the wiper blade 20c away from the windshield glass 20a of the front window 20 and at a level above the stopper member 20b. In this state, the windshield wiper 22 is completely set apart from the front window 20 so that the latter can be opened and closed free of any interferential troubles with the windshield wiper assembly 22. As soon as the wiper 22 is turned on, the slide block 35 is slid down along the sloped wall member 36 to bring the wiper blade 22c into abutting engagement with the windshield 20a. From this position, the oscillating arm 22a is further stepped out onto the windshield 20a by a predetermined angle before starting the alternate sweeping of the sectoral range as indicated in FIG. 1.

According to the present embodiment which is arranged as described above, the windshield wiper 22 is located clearly outside the front window 20 when at rest, so that the front window 20 can provide a broad and clear view free of obstacles in its entire areas. Further, in case of excavation of the ground at a low level, namely, in case of the so-called deep excavation, for example, the front window 20 can be lifted up to open the front side of the operator's cab completely. As soon as the front window 20 is placed in a full-open position parallel with the roof, it is fixed in that position by a stopper mechanism which is not shown.

At the time of opening or closing the front window 20, the slide pin 25 of the pin-latch unit 23 is retained in the retracted position. Under these circumstances, the switch 29 is ON as indicated by solid line in FIG. 2, that is to say, the wiper switch 33 is locked in inoperative state, so that the wiper 22 remains in the receded rest position as long as the front window 20 is open, precluding the possibilities of being inadvertently actuated by turning on the wiper switch 33. Accordingly, there is no possibility of the wiper 22 falling toward the operator who is seated on a driver's seat of the operator's cab, or of the wiper blade 22c or other components of the wiper assembly suffering from deformations or damages by hitting against the frame 20c of the front window 20 or the like.

Even when the front window 20 has been lowered and fully closed, it is not yet in a stably fixed state because of a certain degree of looseness which inevitably exists to ensure smooth sliding movements of the window. However, the front window 20 can be fixed to such a degree as to stay without rattling even under vibrated or shaken conditions, by pulling the operating knob 26 to shift the slide pin 25 of the pin-latch unit 23 from the retracted position to the locking position where the slide pin 25 is protruded into the pin receptacle hole 28a of the pin holder 28 on the frame 21 as indicated by imaginary line in FIG. 2.

As soon as the slide pin 25 is inserted into the pin receptacle hole 28a, the pusher rod 30 is pushed against the spring 31 and therefore the movable contact 29b on the pusher rod 30 is moved away from the stationary contact 29a, thereby rendering the wiper switch 33 operative. Accordingly, in this unlocked position, the operator can switch on the windshield wiper 22 any time, for example, while working in rains or when it becomes necessary to sweep the front window for any other reason. Upon turning on the wiper switch 33, the wiper 22 in the above-described rest position is moved into the operating position on the front window 20, bringing the wiper blade 22c into abutting engagement with the windshield 20a. The wiper 22 is put in alternate sweeping motion over a predetermined range to wipe off water droplets and water films from surfaces of the window pane 20a. Upon stopping the windshield wiper 22, the slide block 35 with the inclined surface 35a on its lower side is moved into the receded position on top of the sloped wall member 36, setting apart the wiper blade 22c from the front window pane 20a. At this time, in order to let the inclined surface 35a of the slide block 35 securely ride onto the sloped wall member 36, the front window 20 has to be retained in a fixed state. In this regard, since the front window 20 is retained in a suitably fixed state by the pin-latch unit 23 as described above, the windshield wiper assembly 22 can smoothly return to its rest position.

The windshield wiper 22 is used normally under rainy weather conditions, and, in such weather conditions, generally the front window 20 is completely closed to shield the operator's cab from rain drops. Therefore, there will arise no troubles in particular even if the windshield wiper 22 is rendered operative only when the front window 20 is completely closed and stopped in a fixed state by the pin-latch unit 23. Nevertheless, there may arise an awkward situation when the front window 20 is fully closed but not locked, where the operator might try to turn on the wiper switch 33 which however still remains inoperative due to a failure of applying the pin-latch unit 23 before starting the windshield wiper 22. If the windshield wiper 22 does not start, the operator may consider that something is wrong with the wiper 22 itself. In order to preclude such an awkwardly confusing situation to the operator, it is desirable to display instructions on an indicator panel or the like, reminding the operator to apply the slide pin 25 of the pin-latch unit 23 whenever he or she tries to turn on the wiper switch 33 while the window switch 29 is ON.

Figure 5:
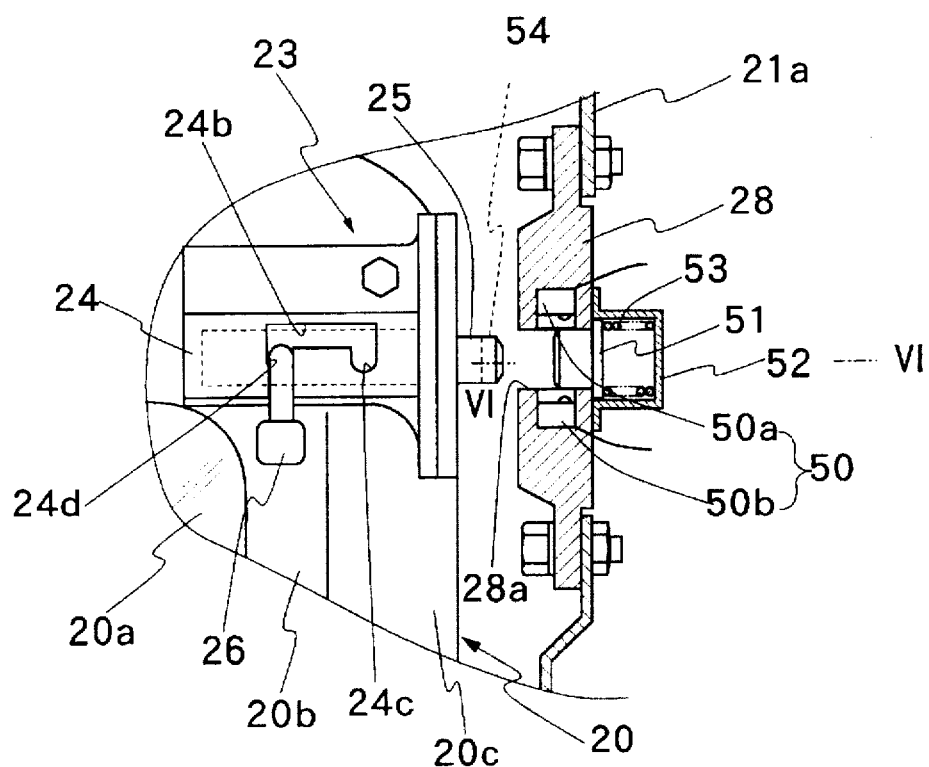
FIG. 5 is a diagrammatic illustration of an optical sensor shown as an example of detection means for detecting a slide pin of a pin-latch unit which has been shifted into a locking position.
Figure 6:
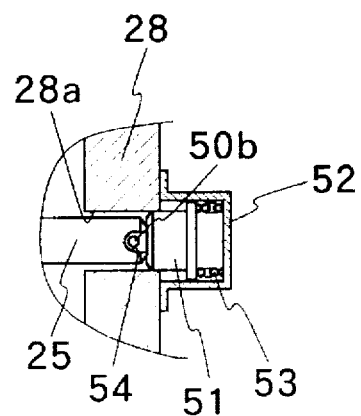
FIG. 6 is a schematic sectional view taken on line VI—VI of FIG. 5, showing the slide pin in the applied position.
Figure 7:
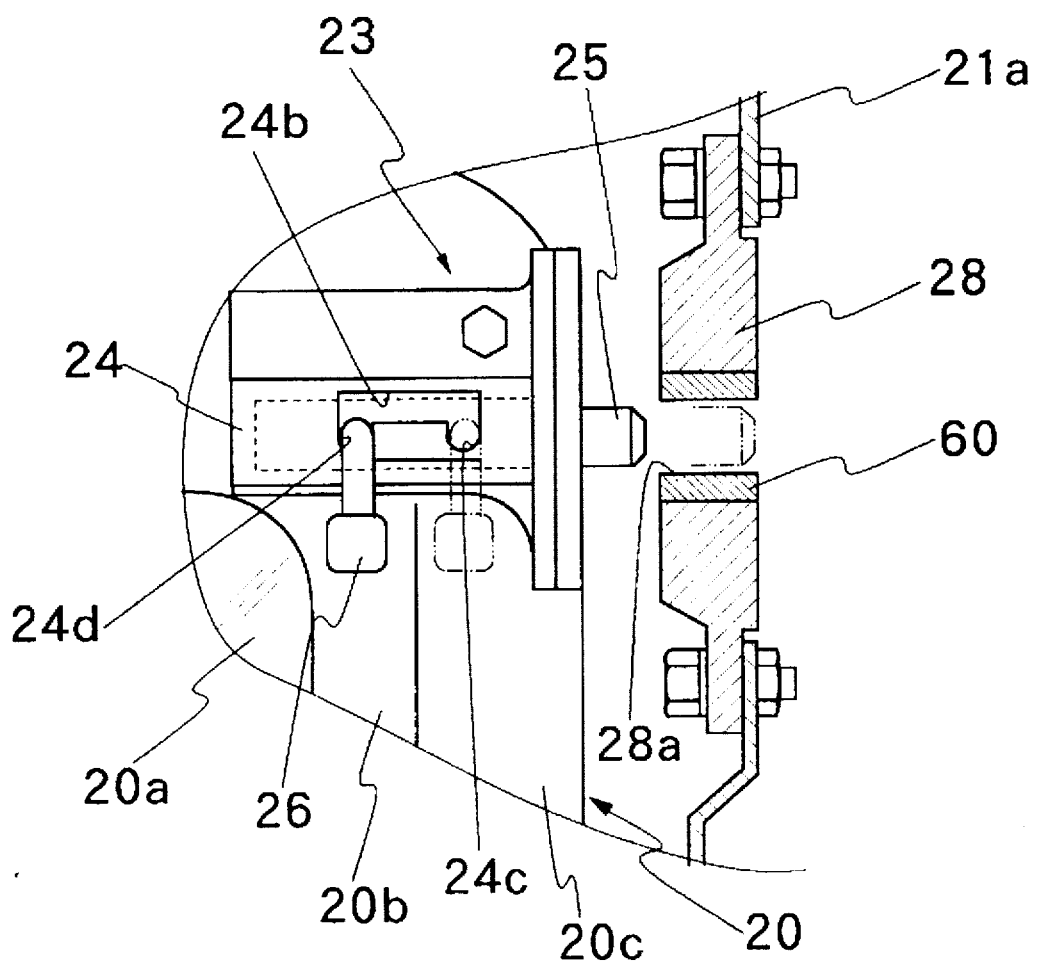
FIG. 7 is a schematic illustration of another example of the detection means for detecting the slide pin of the pin-latch unit which has been shifted to a locking position.
Figure 8:
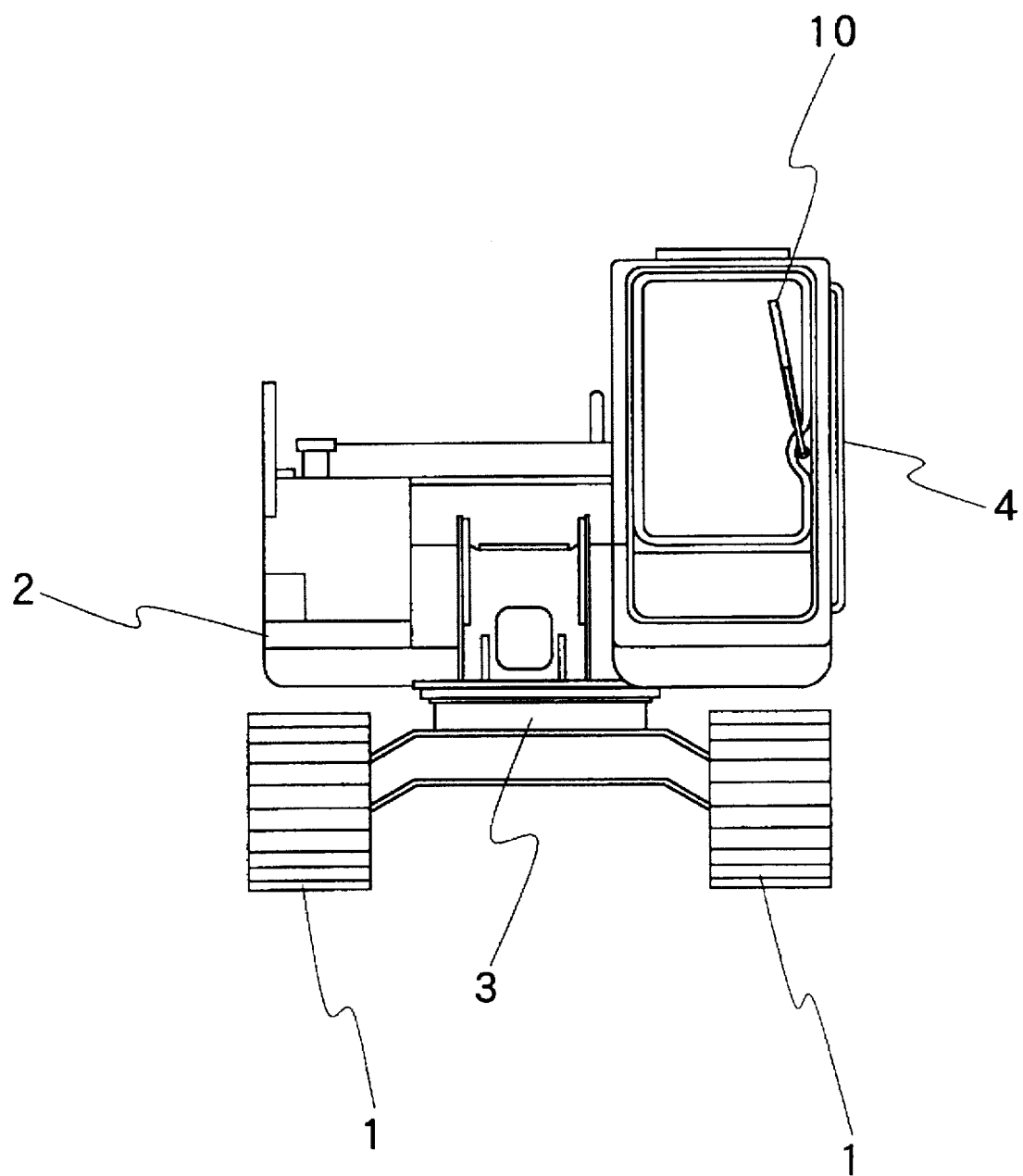
FIG. 8 is a schematic front view of a hydraulic power shovel shown as a typical example of construction machines, front working mechanism of the power shovel being omitted for the convenience of illustration.
Figure 9:
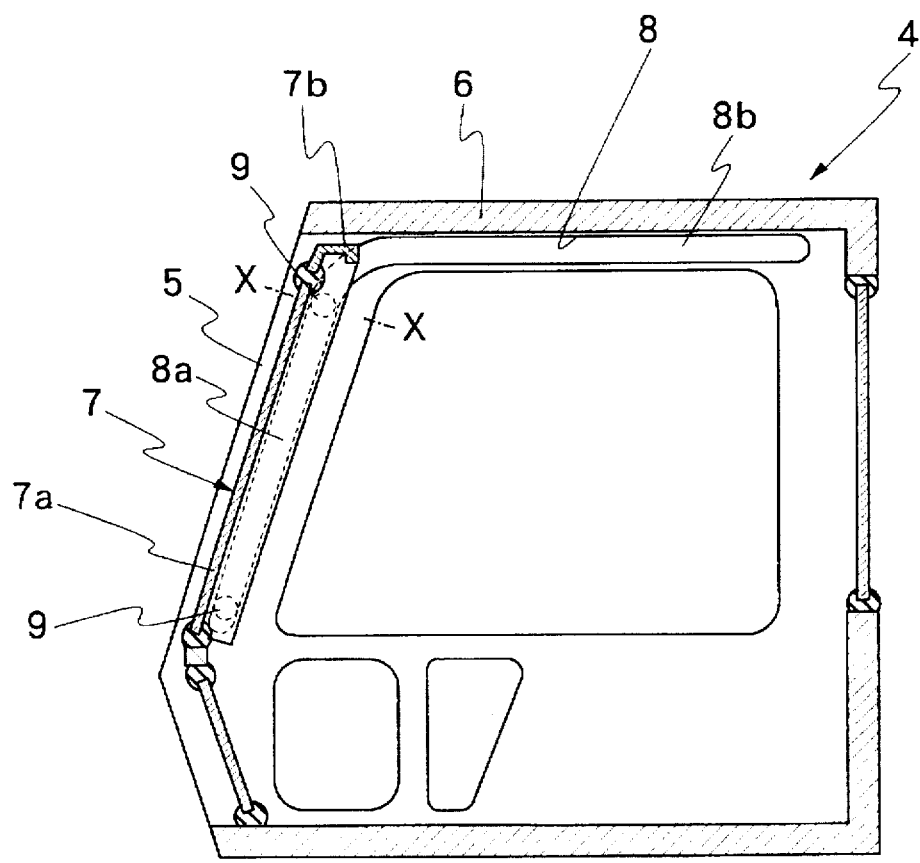
FIG. 9 is an inside view of an operator's cab with operators seat and other interior fixtures omitted for the convenience of illustration.
Figure 10:
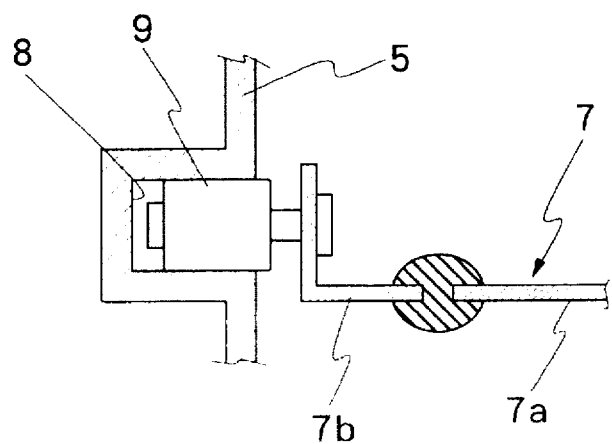
FIG. 10 is a schematic sectional view taken on line IX—IX of FIG. 9.

Referring now to FIGS. 5 to 7, there is shown another example of the detection means, which is arranged to detect the window locking by the slide pin of the pin-latch unit, without contacting the fore end of the slide pin 25 which is protruded into the pin receptacle hole 28a of the pin holder 28.

More specifically, shown in FIGS. 5 and 6 is an optical detection means or optical sensor 50 including a light emitting element 50a and a photosensitive element 50b which are located opposingly within and across the pin receptacle hole 28a of the pin holder 28. In this instance, the optical sensor 50 could be arranged such that light from the light emitting element 50a is received by the photosensitive element 50b when the slide pin 25 is positioned outside the pin receptacle hole 28a, and blocked by the slide pin 25 only when it is protruded into the pin receptacle hole 28a of the pin holder 28. In the event a trouble should occur to the light emitting element 50a or to the photosensitive element 50b, however, this sort of arrangement would erroneously unlock the wiper switch 33 and actuate the motor 34 as soon as the wiper switch 33 is turned on, even though actually the front window 20 is not locked in a fixed state. In order to preclude such deceiving situations, a light blocking member 51 is slidably fitted in the pin receptacle hole 28a and a guide member 52 which is mounted on the pin holder 28 on the side away from the slide pin 25. A biasing spring 53 is charged in the guide member 52 to urge the light blocking member 51 into a predetermined projected position crossing the light path from the light emitting element 50a to the photosensitive element 50b.

On the other hand, as shown particularly in FIG. 6, the slide pin 25 is provided with a light passage groove 54 across its head end in a direction perpendicular to its axis to extend in the same direction as the light path from the light emitting element 50a to the photosensitive element 50b. Accordingly, as the slide pin 25 is protruded as far as a predetermined position within the pin receptacle hole 28a, the light blocking member 51 is thereby pushed back against the action of the biasing spring 53 until the light path between the light emitting element 50a and photosensitive element 50b is occupied by the light passage groove 54 at the head end of the slide pin 25.

With the arrangements just described, under normal conditions, that is to say, unless the slide pin 25 is protruded into a predetermined position within the pin receptacle hole 28a, the light path from the light emitting element 50a to the photosensitive element 50b is blocked by the light blocking member 51. Under these conditions, the wiper switch 33 is locked in inoperative state and therefore cannot be turn on even if it is touched by hand. Accordingly, as long as the front window 20 is open, there is no possibility of the windshield wiper 22 being actuated by inadvertently turning on the wiper switch 33, even when the optical sensor 50 happens to be out of order. The light path from the light emitting element 50a to the photosensitive element 50b is opened through the groove 54 at the head end of the slide pin 25 upon protruding same into the pin receptacle hole 28a to lock the front window 20. Consequently, light is now received by the photosensitive element 50b to unlock the wiper switch 33 into operative state, permitting to start the wiper 22 as soon as the wiper switch 33 is turned on.

Shown in FIG. 7 is a further example of the detection means, incorporating a magnetic sensor 60 within the pin receptacle hole 28a of the pin holder 28. More specifically, in this case, the slide pin 25 is formed of magnetic material so that the magnetic sensor 60 produces no output signal unless the front window 20 is in locked state, that is to say, as long as the slide pin 25 is located outside the pin receptacle hole 28a, prohibiting actuation of the motor 34 even if the wiper switch 33 is pushed or touched by hand. As soon as the slide pin 25 is introduced into the pin receptacle hole 28a to lock the front window 20, this is detected by the magnetic sensor 60 to render the wiper switch 33 operative. Thus, the motor 34 can now be actuated to start the windshield wiper 22.

POSSIBILITIES OF INDUSTRIAL APPLICATIONS

A windshield wiper is controlled to become operative only when the front window is detected to be in locked state, in relation with operation of the slide pin of the pin-latch unit which is applied to lock the front window in a fully closed position, for operating the windshield wiper under safe conditions while securing a broad view field through the front window of the operator's cab.

What is claimed is:

1. In a construction machine including a vertically slidable front window fitted on a front side of an operator's cab for movement between an opened and closed position, a windshield wiper assembly mounted on a frame of said operator's cab alongside said front window and having a wiper blade for cleaning the front window, a pin-latch unit for locking said front window in said closed position and a windshield wiper control device for controlling operation of said windshield wiper assembly;

said control device comprising a detection device for detecting a locked state of said front window in the closed position by way of application of a slide pin of said pin-latch unit, said control device rendering said windshield wiper assembly operative in the locked state of the pin-latch unit and inoperative in the unlocked state of the pin-latch unit on the basis of a detection signal from said detection device.

2. In a construction machine as defined in claim 1, wherein said pin-latch unit includes a slide pin slidably received in a slide guide provided on a part of said front window, and a pin holder provided opposingly on a part of a frame of said operator cab, said slide pin being movable into and out of a pin receptacle hole on said pin holder for locking and unlocking said front window.

3. In a construction machine as defined in claim 2, wherein said slide pin has an operating knob connected thereto, said operating knob being retainable in one of a first position where said slide pin is protruded into said pin holder and a second position where said slide pin is retracted from said pin holder.

4. In a construction machine as defined in claim 2, wherein said detection device is arranged to detect locked state of said front window by way of position of said slide pin.

5. In a construction machine as defined in claim 4, wherein said detection device is a switch to be operated by plunging action of said slide pin into said pin holder.

6. In a construction machine as defined in claim 4, wherein said detection device is a non-contacting sensor arranged in non-contacting relation with said slide pin to detect intrusion of the latter into said pin holder.

7. In a construction machine as defined in claim 6, wherein said non-contacting sensor is either an optical sensor or a magnetic sensor.

8. In a construction machine as defined in claim 1, wherein said frame of said operator's cab has inner and outer walls in spaced relation with each other, providing therebetween a wiring space for said detection device.

9. In a construction machine as defined in claim 1, wherein said detection device further comprises an indicator device to indicate a non-locking state of said slide pin.

10. In a construction machine as defined in claim 1, further comprising a sloped surface provided on one of an oscillating arm of said wiper assembly and said frame of said operator's cab, the wiper blade of said wiper assembly being moved away from said front window and said arm rested on said sloped surface when operation of said windshield wiper is stopped.

* * * * *